United States Patent
Morton et al.

[11] Patent Number: 6,009,657
[45] Date of Patent: Jan. 4, 2000

[54] FISH BAIT

[75] Inventors: Peter Morton, Cornwall, United Kingdom; Ole Martin Rudi, Oslo, Norway

[73] Assignee: Norbait Da, Drammen, Norway

[21] Appl. No.: 08/913,344

[22] PCT Filed: Mar. 12, 1996

[86] PCT No.: PCT/GB96/00574

§ 371 Date: Sep. 11, 1997

§ 102(e) Date: Sep. 11, 1997

[87] PCT Pub. No.: WO96/28021

PCT Pub. Date: Sep. 19, 1996

[30]    Foreign Application Priority Data

Mar. 15, 1995 [GB] United Kingdom ............... 9505209

[51] Int. Cl.[7] .................... A01K 85/01; A01K 97/02
[52] U.S. Cl. ................... 43/42; 43/42.06; 43/44.99; 426/1
[58] Field of Search .............. 43/42, 42.24, 42.06, 43/42.53, 44.99; 426/1, 135; 452/30, 22

[56]    References Cited

U.S. PATENT DOCUMENTS

| | | | |
|---|---|---|---|
| 3,047,975 | 8/1962 | Pretorius | 43/42.06 |
| 3,410,689 | 11/1968 | Nathan | 99/3 |
| 3,958,357 | 5/1976 | Frank | 43/42.06 |
| 4,251,547 | 2/1981 | Liggett | 426/1 |
| 4,362,748 | 12/1982 | Cox | 426/1 |
| 4,752,480 | 6/1988 | Charbonnier et al. | 426/1 |
| 4,950,488 | 8/1990 | Schweitzer et al. | 426/1 |
| 5,062,235 | 11/1991 | Cook, Jr. et al. | 43/42 |
| 5,197,219 | 3/1993 | Cook, Jr. et al. | 43/42 |
| 5,216,829 | 6/1993 | Morton | 43/42.06 |

FOREIGN PATENT DOCUMENTS

| | | |
|---|---|---|
| 0 463 778 A1 | 1/1992 | European Pat. Off. . |
| 2 584 271 | 1/1987 | France . |
| 2 641 941 | 7/1990 | France . |
| 33 33 249 | 3/1984 | Germany . |
| WO 86/06251 | 11/1986 | WIPO . |
| WO 90/12500 | 11/1990 | WIPO . |

OTHER PUBLICATIONS

Patent Abstracts of Japan, vol. 18, No. 257 (C–1200) May 17, 1994 (JP–A–06 038656).
Patent Abstracts of Japan, vol. 16, No. 213 (C–0942 May 20, 1992 (JP–A–04 040845).
Patent Abstracts of Japan, vol. 16, No. 66 (C–0912) Feb. 19 1992 (JP–A–03 262434).

*Primary Examiner*—Jack W. Lavinder
*Attorney, Agent, or Firm*—Sughrue, Mion, Zinn, Macpeak & Seas, PLLC

[57]    ABSTRACT

A fish bait (1) is provided in which individual pieces of bait material (2) are suspended and evenly distributed throughout a homogenized mixture of bait material and a gelling agent (3), and enclosed in a supporting tubular mesh (4). The fish bait is obtained by mixing bait material with a gelling agent to form a substantially homogeneous mixture, adding further bait material to the homogenous mixture so that bait material is suspended in the homogeneous mixture and extruding the suspended mixture into a mesh tube and subsequently allowing the gelling agent to set. Once set, the gelling agent stabilizes the suspended structure of the fish bait and allows the controlled release and diffusion of attractants. Preferably, the gelling agent is an alginate.

23 Claims, 1 Drawing Sheet

FISH BAIT

TECHNICAL FIELD

Long line fishing is a method of commercial fishing in which long lines having several thousand traces each with a baited hook attached to them are left suspended in the sea. The long lines are subsequently reeled in together with any fish that have been caught. One of the chief influences on the success of this type of fishing is the quality of the bait both in the sense of its attractiveness to fish and in the sense of its remaining on the hook and remaining in an attractive condition to the fish throughout the fishing period during which the long line is deployed.

BACKGROUND ART

EP-B-0,474,660 describes a fish bait suitable for the long line fishing industry comprising a natural bait material enclosed in a porous casing and cut into short lengths. The casing is made of a semi-permeable membrane and a mesh tube. The mesh tube provides structural strength for the bait package and ensures the retention of the bait by a hook. The semi-permeable membrane protects the natural bait material whilst allowing attractants to permeate through it into the sea to attract fish. This fish bait remains on the hook consistently as a result of the reinforcing mesh tube and remains effective for a long period of time as the attractants contained within the bait are metered out slowly through the semi-permeable membrane. The bait is very much cleaner and easier to use than pieces of raw fish, for example, and because it can be made to a standard uniform size, multi-hook line deployment, particularly using an automatic baiting machine, is more efficient.

DISCLOSURE OF INVENTION

According to a first aspect of the present invention, a fish bait comprises individual pieces of bait material suspended and evenly distributed throughout a homogenised mixture of bait material and a gelling agent, enclosed in a supporting tubular mesh.

According to a second aspect of the present invention, a process for manufacturing a fish bait comprises the steps of:

(1) mixing bait material with a gelling agent to form a substantially homogenous mixture;

(2) adding further bait material to the homogenous mixture so that bait material is suspended in the homogenous mixture; and, (3) extruding the suspended mixture into a mesh tube and subsequently allowing the gelling agent to set.

Suitable gelling agents include alginate, guar gum, carrageenin, agar agar, pectine, gellan gum, xanthan gum and gelatine. Once set, the gelling agent stabilizes the suspended structure of the bait and allows the controlled release and diffusion of attractants as with the fish bait described in EP-B-0,474,660. Preferably, the gelling agent is an alginate. Alginate is a non-toxic biopolymer extracted from brown seaweed and is supplied in powdered form. It must be mixed with water before it will form a gel. Alginate is a cold soluble and cold setting gelling agent and therefore simplifies the mixing process.

Preferably, a gelling inhibitor, known as a sequestrant, is added to prevent the premature setting of the gelling agent. Preferably, the gelling inhibitor is tetra-sodium-pyrophosphate.

Preferably, the bait material comprises natural material. Suitable natural bait material includes whole fish, fish offal, mollusca or derivatives and substrates thereof. The bait material may also comprise synthetic chemical attractants but preferably, the bait material consists solely of natural material.

Preferably, the bait material in step 2 of the process is added over two or more stages of mixing to graduate the size of particles of bait material. Preferably, this bait material is chilled or partially frozen.

More preferably, the bait material added to the homogenous mixture in step 2 also comprises pieces of bait material which are mixed in the homogenous mixture for a sufficient period to distribute the bait material throughout the mixture without breaking up the pieces to any great extent. Preferably, the pieces of bait material are added over two or more stages of mixing.

Preferably, a gel activating agent is added to the suspended mixture before it is extruded. Preferably, in the case when alginate is used, the gel activating agent is a di-, tri- or polyvalent metal cation. Preferably the gel activating agent is a calcium salt solution. Most preferably, the gel activating agent is solution of calcium sulphate. This activating agent off-sets the effects of any gel inhibitor and causes the alginate within the fish bait to gel. Preferably, the gel activating agent is added into the suspended mixture by an in-line mixer.

The suspended mixture may be extruded through a nozzle straight into the mesh tube and the gelling agent allowed to set naturally. However, preferably, the extruded bait is exposed to a gel activating agent to set the gel in the surface region of the extruded bait to form a semipermeable skin. This facilitates subsequent handling of the extruded bait and prevents material seeping through the tube mesh. Preferably, when alginate is used, the gel activating agent comprises a di-, tri- or polyvalent metal cation. Preferably, the gel activating agent is a calcium salt solution. Most preferably, the gel activating agent is a solution of calcium chloride which causes rapid setting of the alginate gel in the surface of the extruded bait to form a skin. The calcium salt solution may be contained within a bath through which the extruded bait passes but preferably, the calcium salt solution is sprayed onto the extruded bait which is then washed in a spray of water to remove excess solution.

Preferably, a filler material is added to the suspended mixture before it is extruded into the mesh tube.

Preferably, the filler material comprises an exfoliated metal silicate. Other alternatives include starch and maltodextrin. Examples of suitable exfoliated metal silicates are magnesium and aluminium silicate. This filler material adds bulk to the bait, helps prevent seepage through the tube mesh and generally speeds up the gelling process. It also increases the buoyancy of the fish bait. Fish derivatives and substrates are also suitable fillers.

The mixing process may take place in a bowl cutter or other commercial mincing, cutting and mixing equipment.

Preferably, the temperature of the mixture is reduced during the mixing stages of the process to prevent chemical breakdown of stimulants within the bait material. This may be achieved by pre-cooling or partially freezing the bait material. Alternatively, or additionally, the bowl cutter or other commercial equipment used may be refrigerated.

The bait may be extruded into any suitable length and preferably, is subsequently frozen. The extruded bait may be frozen by passing through a tunnel freezer before being boxed for storage and transport. In use, the bait is at least partially defrosted and fed into an automatic long line hook baiting system which cuts the bait into shorter lengths. More preferably, the bait is fully defrosted before baiting.

The fish bait of the present invention fulfils all the requirements of the long line fishing industry. Tests indicate that the fish bait can be successfully deployed using conventional automatic baiting machinery and achieve a high yield. Importantly, the choice of natural bait material can determine the type of fish caught and so a particular species of fish can deliberately be targeted using the bait of the present invention so that substantially only that species is caught. Furthermore, the fish bait is entirely bio-degradable and therefore environmentally friendly.

BRIEF DESCRIPTION OF DRAWINGS

Examples of the present invention will now be described with reference to the accompanying drawings, in which.

BEST MODE FOR CARRYING OUT THE INVENTION

Figure 1:
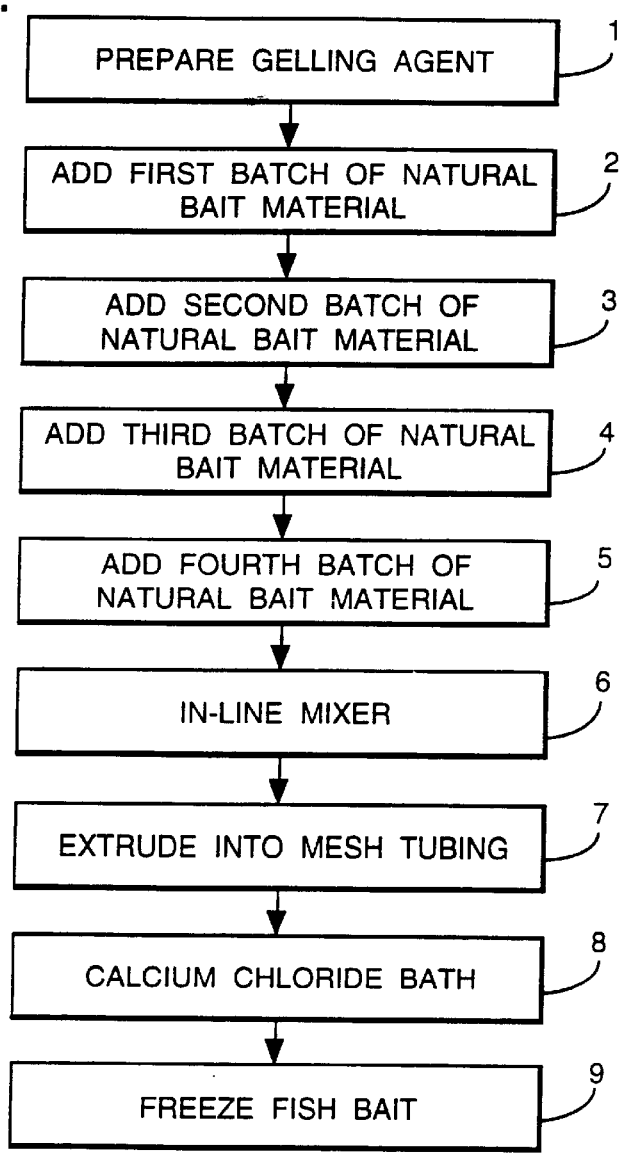
FIG. 1 shows a flow diagram of a fish bait manufacturing process in accordance with the present invention; and, FIG. 2 shows a cross-section of the fish bait.

In a first example, in step 1 of FIG. 1, 0.45 kilograms of an alginate, sold under the trade name PROTANAL LF60, is mixed with 0.06 kilograms of tetrasodium-pyrophosphate, a gel inhibitor, in 12 liters (12 kilograms) of water within a commercial bowl cutter. The bowl cutter is operated at low speed for 1.5 minutes and then on high speed for a further 3.5 minutes.

In step 2, 9 kilograms of pre-chilled Mackerel bait material comprising a mixture of heads and fillet waste, is added to the bowl and mixed at high speed for 3.5 minutes. After this, in step 3, a further 9 kilograms of Mackerel bait material is added and mixed for a further 2.5 minutes. This mixing process produces a liquidized mixture in which the particle size of the bait material is graduated. The temperature of the mixture should now be a few degrees above freezing. It is important to keep the temperature of the mixture low to prevent chemical breakdown of stimulants within the bait material.

Next, in step 4, 9 kilograms of Mackerel bait material are added to the bowl cutter and mixed at low speed for a period of 1.5 minutes. A further 18 kilograms of Mackerel bait material are added in step 5 to the bowl cutter and mixed in gently at low speed for a period of 1 minute. This produces a mixture in which solid pieces of bait material are suspended in the original homogenous mixture.

In step 6, the suspended mixture is then transferred to a filler unit and passes through to a commercial paddle wheel in-line mixer where it is mixed with a 22.5% concentration solution of calcium sulphate. The flow rate of the calcium sulphate solution is set at around 1 liter per minute. The calcium sulphate solution acts as a gel activator and typically causes the alginate gel to set within 20 minutes.

In step 7, the mixture is extruded through a nozzle at a pressure of 5 bar into 40 denier viscose fibre mesh tube of a type similar to that used in medical applications. The apparatus used to do this is similar to the type used in the sausage industry. The fibre mesh tube is provided with a number of lines of weakness by selectively omitting needles from a commercial knitting machine used to knit the mesh tube. The fibre mesh tube ensures that the bait will remain on a hook when fishing but is easily cleaned from the hook by a system of either static or rotating brushes when the fishing line is retrieved. This feature is described in more detail in the Applicant's co-pending British Patent Application (Agent's reference SNR 05268GB) filed on Mar. 7, 1996.

In step 8, the extruded bait is passed through a bath containing a 3% concentrated solution of calcium chloride. The calcium chloride solution acts as a rapid gel activator and sets the alginate gel in the surface of the bait on contact to form a skin.

Finally, in step 9, the fish bait is cut into lengths of around 1 meter, and laid flat in boxes before being frozen.

Figure 2:
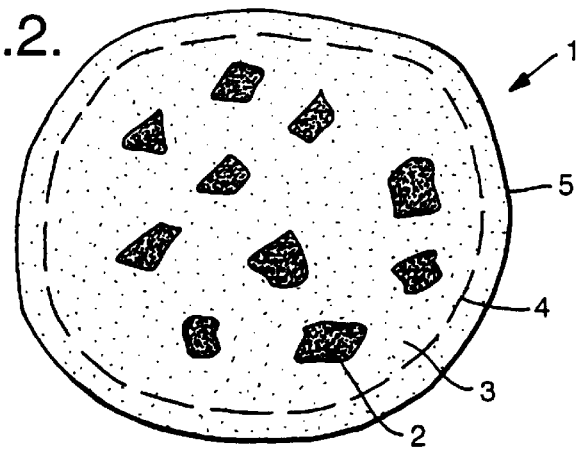

FIG. 2 shows a cross-section of the fish bait 1. As shown, individual pieces of bait material 2 are suspended and evenly distributed throughout the homogenised mixture of bait material and gelling agent 3 and enclosed within the supporting tubular mesh 4. The porous nature of the mesh 4 allows a small amount of the homogenised bait material through the mesh to form an external layer 5 while retaining the bulk of the bait material within the tubular mesh. The surface layer 5 has a depth of between 2 and 2.5mm.

As an alternative, in step 6, around 4.5 kilograms of exfoliated metal silicate, for example magnesium or aluminium silicate, is also added to the mixture in the in-line mixer. The exfoliated metal silicate acts as a filler material, helps prevent seepage through the tube mesh and generally speeds up the gelling process. It also increases the buoyancy of the fish bait.

In another example, the natural bait material added in steps 2 and 3 is Salmon, usually consisting of a mixture of heads and fillet waste, and the solid bait material added in step 4 and 5 is Herring.

The natural bait material used to form the fish bait of the present invention can be chosen to target a particular species of fish. For example, it has been found that the Mackerel mix described above is particularly efficient at targeting Haddock.

Other suitable natural bait material which may be used includes Sardines, Caplin, Horse Mackerel and Squid.

As a general guide, it is believed that the bait mixture should comprise approximately 0.5 to 1% wt alginate, 0.1 to 0.2% wt tetra-sodium-pyrophosphate, 20 to 25% wt water, 25 to 35% wt bait material in steps 2 and 3, 40 to 45% wt solid bait material in steps 4 and 5, and 7.0 to 10% wt filler.

We claim:

1. A process for manufacturing a fish bait comprising the steps of:

(1) mixing first bait material with a gelling agent to form a substantially homogenous mixture;

(2) adding further bait material to the homogenous mixture so that at least some of said first bait material or said further bait material is suspended in the homogenous mixture; and, (3) extruding the suspended mixture into a mesh tube and subsequently allowing the gelling agent to set.

2. A process according to claim 1, in which the gelling agent is an alginate.

3. A process according to claim 1, in which a gelling inhibitor is added to prevent the premature setting of the gelling agent.

4. A process according to claim 1, in which the bait material comprises solely natural material.

5. A process according claim 1, in which the bait material in step 2 of the process is added over two or more stages of mixing to graduate the size of particles of bait material.

6. A process according to claim 5, in which the bait material is chilled or partially frozen.

7. A process according to claim 1, in which the bait material added to the homogenous mixture in step 2 also comprises pieces of bait material which are mixed in the homogenous mixture for a sufficient period to distribute the bait material throughout the mixture without breaking up the pieces to any great extent.

8. A process according to claim 7, in which the pieces of bait material are added over two or more stages of mixing.

9. A process according to claim 1, in which a gel activating agent is added to the suspended mixture before it is extruded.

10. A process according to claim 9, in which the gel activating agent is added into the suspended mixture by an in-line mixer.

11. A process according to any one of claim 9, in which the gel activating agent comprises a di-, tri- or polyvalent metal cation.

12. A process according to claim 1, in which the extruded bait is exposed to a gel activating agent to set the gel in the surface region of the extruded bait to form a semi-permeable skin.

13. A process according to claim 12, in which the gel activating agent is contained within a bath through which the extruded bait passes.

14. A process according to claim 12, in which the gel activating agent is sprayed onto the extruded bait which is then washed in a spray of water to remove any excess.

15. A process according to claim 1, in which a filler material is added to the suspended mixture before it is extruded into the mesh tube.

16. A process according to claim 15, in which the filler material comprises an exfoliated metal silicate.

17. A process according to claim 1, in which the mixing process takes place in a bowl cutter or other commercial mincing, cutting and mixing equipment.

18. A process according to claim 1, in which the extruded bait is frozen by passing through a tunnel freezer.

19. A fish bait comprising individual pieces of bait material suspended and evenly distributed throughout a homogenised mixture of bait material, a largest particle size of the homogenised mixture being smaller than a size of the suspended bait material, and a gelling agent, enclosed in a supporting tubular mesh.

20. A fish bait according to claim 19, in which the gelling agent is an alginate.

21. A fish bait according to claim 19, in which the bait material comprises solely natural material.

22. A fish bait according to claim 19, further comprising a filler material.

23. A fish bait according to claim 22, in which the filler material comprises an exfoliated metal silicate.

* * * * *